(12) United States Patent
Henny et al.

(10) Patent No.: US 8,282,041 B2
(45) Date of Patent: Oct. 9, 2012

(54) FASTENING ELEMENT FOR INSULATION PACKAGES

(75) Inventors: Dirk Henny, Stade (DE); Christian Thomas, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 279 days.

(21) Appl. No.: 12/696,756

(22) Filed: Jan. 29, 2010

(65) Prior Publication Data

US 2010/0187362 A1  Jul. 29, 2010

Related U.S. Application Data

(60) Provisional application No. 61/148,326, filed on Jan. 29, 2009.

(30) Foreign Application Priority Data

Jan. 29, 2009 (DE) .......................... 10 2009 006 578

(51) Int. Cl.
*B64C 1/00* (2006.01)

(52) U.S. Cl. ...................... 244/129.1; 244/119; 244/121

(58) Field of Classification Search .............. 244/129.1, 244/129.2, 131, 117 R, 119, 120, 121
See application file for complete search history.

(56) References Cited

U.S. PATENT DOCUMENTS

| | | | | |
|---|---|---|---|---|
| 5,924,469 A * | 7/1999 | Whittemore | ............... | 160/368.1 |
| 6,966,549 B2 * | 11/2005 | Costello et al. | ................. | 267/89 |
| 7,462,006 B2 * | 12/2008 | Benthien | ....................... | 410/107 |
| 7,775,479 B2 | 8/2010 | Benthien | | |
| 7,895,810 B2 | 3/2011 | Benthien | | |
| 2008/0283713 A1 | 11/2008 | Speggiorin | | |
| 2010/0127128 A1 * | 5/2010 | Giavarini | ....................... | 244/131 |

FOREIGN PATENT DOCUMENTS

| | | |
|---|---|---|
| DE | 19611435 A1 | 3/1997 |
| DE | 29716006 U1 | 11/1997 |
| DE | 29802328 U1 | 5/1998 |
| DE | 29812955 U1 | 11/1998 |
| DE | 19805474 C1 | 7/1999 |
| DE | 202006001187 U1 | 4/2006 |
| DE | 102006023209 A1 | 11/2007 |
| DE | 102007011621 A1 | 7/2008 |
| WO | 2007131583 A1 | 11/2007 |

OTHER PUBLICATIONS

German Office Action dated Apr. 13, 2011 for German Application No. 10 2009 006 578.4.

* cited by examiner

*Primary Examiner* — Christopher P Ellis
*Assistant Examiner* — Medhat Badawi
(74) *Attorney, Agent, or Firm* — Ingrassia Fisher & Lorenz P.C.

(57) ABSTRACT

A fastening element includes, but is not limited to at least one first body, at least one second body, and at least one locking device. The first body and the second body in each case on one end include, but are not limited to a pressing element for pressing an insulation package against an object. The first body and the second body movably engage each other so that the pressing elements are located at opposite ends of the fastening element. The at least one relative position of the first body to the second body may be fixed by means of the locking device. In this way effective fastening of insulation packages to objects in an aircraft cabin may be ensured without all the insulation packages having to comprise openings for accommodating fastening pins.

17 Claims, 5 Drawing Sheets

FASTENING ELEMENT FOR INSULATION PACKAGES

CROSS-REFERENCE TO RELATED APPLICATIONS

This application claims the benefit of the filing date of German Patent Application No. 10 2009 006 578.4 filed Jan. 29, 2009 and of U.S. Provisional Patent Application No. 61/148,326 filed Jan. 29, 2009, the disclosures of which these applications are hereby incorporated herein by reference.

TECHNICAL FIELD

The invention relates to a fastening element for insulation packages in an aircraft cabin, to a method for fastening insulation packages in an aircraft cabin, to the use of a fastening means, and to an aircraft comprising an insulated fuselage with insulation packages and at least one fastening element.

BACKGROUND

For thermal and acoustic insulation of a vehicle cabin, in particular in commercial aircraft, insulation packages are arranged between the interior wall of the cabin and the exterior skin of the vehicle. In widespread use are insulating packages that comprise a bulky material between two foils and that are attached, by means of disc-shaped elements, for example fastening plates, to correspondingly arranged elongated fastening spikes or fastening pins, to the exterior skin of the vehicle and/or to stiffening elements such as frame elements or stringers of the exterior skin of the vehicle.

In order to provide and protect a lead through opening for such elongated fastening pins, frequently foam material rings are used on which the attachment plates establish contact from the outside, and, by means of snap-on lugs or threads of the fastening pins, locally press the insulation packages concerned against the exterior skin of the vehicle and against frame elements of the vehicle's bodywork or fuselage. Such a concept is, for example, presented in DE 10 2006 023 209 A1 and in WO 2007 131 583 A1.

Due to the integration of the foam material rings, the manufacture of corresponding insulation packages is relatively time-consuming and expensive. The use of a multitude of foam material rings in each and every insulation package, with a corresponding number of elongated fastening pins on the exterior skin of the vehicle, and the also corresponding number of fastening plates or other disc-shaped fastening elements that are to be affixed requires a lot of time when fitting out the cabin during production of the vehicle. Furthermore, the foam material rings are a weak element in relation to noise insulation behavior and water resistance. In vehicle bodywork and fuselages which in future will be made from fiber reinforced materials, for example CFRP, with novel geometric shapes of stiffening components such as stringers and frame elements the use of conventional elongated fastening pins will be hard to implement or will be impossible. It would, for example, be necessary, instead of a simple clamping connection or snap-on connection to implement an adhesive connection to arrange the fastening pins on the vehicle body or on the aircraft fuselage. This would also extend the time needed to fit out the vehicle.

In order to reduce the time required to fit out a vehicle cabin, it might be advantageous not to tie insulation packages for thermal and acoustic insulation by means of a multitude of foam material rings on fastening pins to the exterior skin of the vehicle. Furthermore, in order to improve the water resistance and the sound-insulating characteristics of the insulation packages, it would be sensible to largely do without the use of such foam material rings while at the same time achieve a reduction in costs.

Accordingly, it may be an object of the invention to propose a fastening element by means of which reliable fastening of insulation packages to the exterior skin of a vehicle may be ensured without having to make excessive use of foam rings that are incorporated in the insulation packages. It may be a further object of the invention to do without excessive use of conventional fastening pins on the exterior skin of the vehicle. In addition, other objects, desirable features, and characteristics will become apparent from the subsequent summary and detailed description, and the appended claims, taken in conjunction with the accompanying drawings and this background.

SUMMARY

This object may be met by a fastening element in accordance with embodiments of the present invention. The fastening element according to the invention may comprise a first body with a first pressing element and a second body with a second pressing element. The second body may be held to the first body so as to be movable. The first and the second pressing element are preferably positioned on opposite ends of the fastening element according to an embodiment of the invention. In addition the fastening element may comprise a locking device for locking the relative position of the second body to the first body.

In this way a fastening element is created that in each case comprises a pressing element on two opposite sides, wherein the distance between the pressing elements may be varied by changing the relative position of the second body in relation to the first body. By means of the locking device, once the distance between the pressing elements has been set, said distance may be fixed. Accordingly this may make it possible to grip an insulation package between two objects, for example two frame elements of a vehicle body or fuselage, and to clamp or hold insulation packages that are arranged on frame elements. In each case, with each pressing element, the pressing elements of the first and of the second body press correspondingly equipped insulation packages to a frame element.

Integrating foam material rings to provide openings for the usually necessary fastening means on the exterior skin of the vehicle is no longer necessary because in the skin field region between two frames elements all the fastening pins may be replaced by the fastening element according to an embodiment of the invention. A fastener or fastening means according to an embodiment of the invention, which are clamped between two frame elements, preferably extend directly on the surface of the respective insulation package, which surface protrudes into the cabin, thus supporting the insulation package. This provides protection against unintended detachment from the exterior skin of the vehicle. In order to support this holding effect, the insulation package could preferably comprise quilting seams, from which quilting seams fastening elements may extend. Bulky material of the insulation package curves above and below the quilting seams, thus improving the supporting effect.

The first and the second body may in principle be of any geometric design. In order to minimize weight, which is preferable in particular with the use in aircraft fuselages, in an advantageous embodiment the first and the second body may comprise a hollow profile and an elongated rod-like shape. Consequently, for example, the cross section of the first body could exceed that of the second body, which might be inserted in the first body. It would then be possible to slide the second body relative to the first body along the direction of extension of the first body.

In order to keep the weight of the fastening element low, in particular for use in commercial aircraft, in particular materials of low density are suitable. Examples of such materials are CFRP, GFRP, plastics, aluminum, or other light materials in widespread use. In order to further reduce the weight, the first and/or the second body could in addition be perforated. In order to improve the holding effect, the fastening element according to an embodiment of the invention may additionally comprise a slip-resistant coating that may prevent sliding of the insulation packages.

The pressing elements are preferably designed so that they resemble conventional disc-shaped fastening means that in the state of the art are pressed onto the foam material rings. By means of a relatively large surface, it is possible to achieve adequate contact force with minimal contact pressure so that the material of the insulation packages is treated gently.

In order to fix the position of the fastening element, in an advantageous embodiment the pressing elements may comprise engagement mechanism or engagement means, by which the pressing elements may be made to engage correspondingly arranged holding elements. Such holding elements could, for example, be projections, pins, catches or the like, wherein the corresponding engagement mechanism or means may be recesses, passage apertures or catches. It is not mandatory for the holding elements to be immovably arranged on the respective frame elements, instead, the holding elements could, for example, facilitate engagement of the pressing elements with the holding elements by means of a respective spring mechanism.

In a further preferred embodiment of the fastening element, the locking device comprises a lever that in a corresponding connecting link on the first or the second body may be moved from a locked position to an open position and vice versa. For example, a lever could be arranged on the second body, and a connecting link in the form of a slit could be arranged on the first body so that the lever with the second body may be moved along the slit in the first body. The locked position could be achieved by moving the lever in a narrow passage that, for example, could follow on from the slit at an angle of 90° or approximately 90°. In this way, it would also be possible to achieve in a simple manner different spacing between the pressing elements, which correspond to different narrow passages in which the lever could rest.

Preferably, the fastening element according to an embodiment of the invention comprises a spring mechanism which presses the first and the second bodies apart from each other. As a result of this, installation of the fastening element is facilitated because for installation the fastening element merely needs to be pressed together and then automatically reaches a locked position that as a result of movement of the lever is secured in a corresponding locked position. For example, the spring mechanism could be implemented as a simple helical spring which is supported by a surface in the interior of the body and is made to contact that end of the second body that is opposite the pressing element.

In a further advantageous embodiment of the fastening element, one or several object holders may be arranged on the first and/or second body in order to hold objects such as cables, lines or the like. Consequently, it is no longer necessary or necessary only to a reduced extent to additionally provide the insulation packages with lead through openings for holders that are arranged on the fuselage.

Furthermore, at least one object is met by the use of a fastening element according to an embodiment of the invention, by a method for fastening an insulation package, and by an aircraft comprising at least one insulation package and at least one fastening element according to an embodiment of the invention.

BRIEF DESCRIPTION OF THE DRAWINGS

The present invention will hereinafter be described in conjunction with the following drawing figures, wherein like numerals denote like elements.

DETAILED DESCRIPTION

Figure 1:
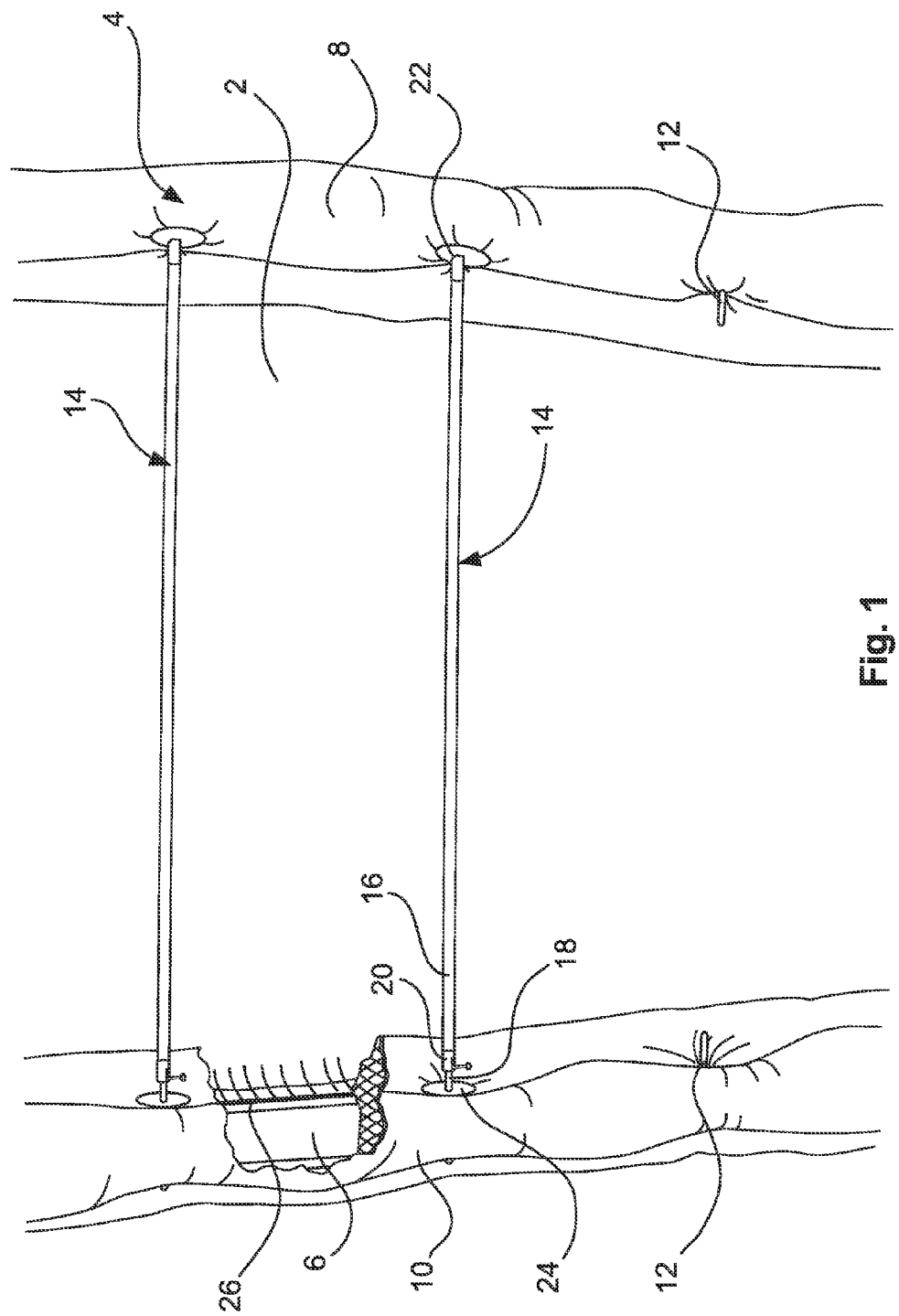
FIG. 1 shows a section of a fuselage with two frame elements, insulation packages and a fastening element according to an embodiment of the invention.

FIG. 1 clearly shows the manner in which insulation packages may be attached to the exterior skin of a vehicle by means of fastening elements according to an embodiment of the invention. The illustration shows an insulation package 2 for a so-called skin field that extends between two frame elements 4 and 6. For this reason it is also referred to as a "field mat". The frame elements 4 and 6 are in each case covered by a frame-element insulation package 8 and 10 ("frame element mat"). Fastening pins 12 are integrated in the frame elements 4 and 6, which fastening pins 12 extend through the fastening-element insulation packages 8 and 10 and project beyond the former to the outside. This makes it possible for a fastening element 14 according to an embodiment of the invention to be fixed to the frame elements.

In the illustration of FIG. 1, the fastening element 14 according to an embodiment of the invention is shaped as a rod-shaped element and comprises a first body 16 and a second body 18. The second body 18 is designed so that it is located in a hollow space or in a recess of the first body 16 and may be slid relative to the first body 16. The first body 16 may also be designed as a hollow cylinder or a tube, which makes it possible to insert the second body 18. By changing the free length of the second body 18, which length projects from the first body 16, it is possible to implement an adjustment of the length of the fastening element 14 according to an embodiment of the invention. With corresponding fixing of a selected length by means of a locking device 20, tensioning the fastening element 14 between the frame elements 4 and 6 becomes possible.

During tensioning of the fastening element 14, two pressing elements 22 and 24 are pressed against the frame-element insulation packages 8 and 10 so that the latter are held to the frame elements 4 and 6. The cross section of the pressing elements 22 and 24 should be sufficient to ensure that the material of the insulation packages is treated with care.

A partial projection in FIG. 1 shows that the insulation package 2 does not just rest in a sheet-like manner against the exterior skin (not shown) of the fuselage, and does not just extend to the frame elements 4 and 6, but instead is partly folded over onto the frame elements 4 and 6. Correspondingly, the margins 26 of the insulation package 2 are also partly covered by the frame-element insulation packages 8 and 10.

In this arrangement the margins could be designed in such a manner that the fastening pins 12 extend past the margins 26 so that the insulation package 2 does not require any foam material rings or openings at all. As an alternative to this it would also be possible for the margins 26 of the insulation package 2 to be designed so as to be flat and essentially without bulky material so that the fastening pins 12 project through corresponding openings in the margins 26. Correspondingly, when the insulation of the vehicle entirely uses fastening elements 14, this results in not only the frame-element insulation packages 8 and 10 being fastened by the fastening elements, but also the underlying margins 26 of the insulation package 2 being fastened. Consequently foam material rings for holding the insulation are only required in the frame-element insulation packages 8 and 10.

In contrast to this in the space between the two frame elements 4 and 6 there is no need to provide foam material rings for the lead through of further fastening pins, which in the state of the art are arranged on the exterior skin of the vehicle and are used for pressing plate-shaped discs or the like against the foam material rings.

It is understood that the illustration of FIG. 1 is only provided as an example, and that a multitude of fastening elements 14 may be used to affix one or several insulation packages 2, 8 and 10.

Figure 2:
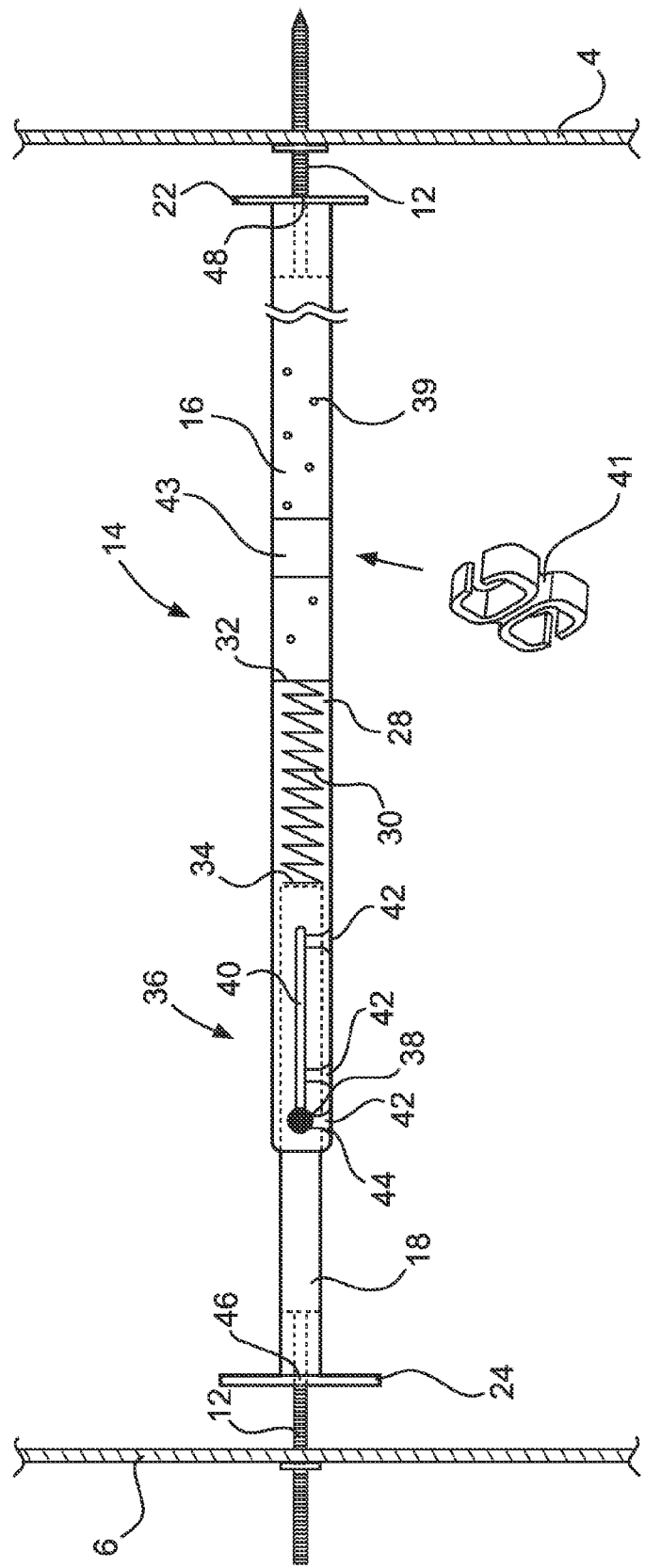
FIG. 2 shows an exemplary embodiment of the fastening element according to an embodiment of the invention.

FIG. 2 provides further details of an exemplary embodiment of a fastening element 14. As an example the first body 16 is a hollow cylinder or tube, into whose hollow space 28 the second body 18 is inserted. The cross section of the second body 18 is accordingly selected so as to correspond to the cross section of the first body 16 so that the second body 18 may easily be slid along within the first body 16.

As a result of sliding the second body 18 within the first body 16 the distance between the two pressing elements 22 and 24 may be varied in order to in this way vary the clamping effect or pressure effect on the frame-element insulation packages 8 and 10 as well as the margins 26 of the insulation package 2. For the sake of simplicity, FIG. 2 does not show the insulation packages 2, 8 and 10, and only the frame elements 4 and 6 are shown. The space between the frame element 4 and the pressing element 22 is taken up by the frame-element insulation package 8 and by the margins 26 of the insulation package 2, while the space between the frame element 6 and the pressing element 24 is taken up by the frame-element insulation package 10 and by the exterior lateral surfaces 26 of the insulation package 2.

In order to facilitate installation of the fastening element according to an embodiment of the invention, a spring 30 is arranged within the first body 16, which spring 30 presses against a holding element 32 within the first body 16. The holding element 32 could, for example, be a shoulder or a projection against which the spring 30 may rest. The end of the spring 30 that is opposite the holding element 32 presses onto an end face 34 of the second body 18 and produces a force that is directed to the excursion of the second body 18 or the pressing element 24 that is arranged thereon. The movement element 14 is thus designed so that the two pressing elements 22 and 24 always push towards the outside, and that said movement element 14 even when being placed into a single fastening pin 12 jams between the frame elements 4 and 6 and does not drop on the floor during installation.

In order to lock a position once it has been set, a locking device 36 is arranged on the fastening element 14. The locking device 36 is, for example, designed such that, for example, a lever 38 is arranged, by way of a screw connection, on the second body 18 thus protruding radially outwards through a slit 40 of the first body 16. In this way the second body 18 may be moved along the first body 16, wherein as a result of delimitation of the extent of the slit 40 unintended dropping of the second body 18 from the first body 16 may be prevented. In order to lock the fastening element 14, relative rotation between the first body 16 and the second body 18 is sufficient, wherein the lever 38 may be placed into one or several narrow passages 42 of the slit 40. The narrow passages 42 may extend perpendicularly to the slit 40 on the outside of the first body 16, thus causing the second body 18 to be fastened. The narrow passages 42 are preferably designed so that the lever 38 may click into place in a depression 44 or indentation, and thereafter no longer moves out of position automatically. The spring 30 furthermore causes the lever 38 to be steadily pushed in onto the narrow passage 42 and onto a depression 44 that may be arranged therein, so that locking is supported and the lever is prevented from moving out of the narrow passage 42.

In order to fix the position relative to the frame elements 4 and 6, in the case shown, at each frame element 4 and 6 a fastening pin 12 for each fastening element 14 is arranged. For engagement, both the pressing elements 22 and 24 and the first body 16 as well as the second body 18 comprise a corresponding recess 46 and 48. Correspondingly, during fastening of the fastening element 14 between two frame elements 4 and 6 the plate-shaped pressing element 22 of the first body 16 could be placed onto the corresponding elongated fastening means 12, wherein, with the locking device 36 unlocked, the second body 18 is pushed into the first body 16, and when the end position is reached is extended again so that the elongated fastening means 12 at the frame element 6 may engage the recess 46 of the second body 18. Subsequently the locking device 36 is locked in a desired position so that a steady clamping force acts on the affected insulation packages 2, 8 and 10, and the fastening element 14 no longer detaches from the frame elements 4 and 6. In order to save weight, the first body 16 and/or the second body 18 may comprise perforations 39 if desired.

As an additional characteristic, the fastening element 14, according to an embodiment of the invention on the first body 16 and/or on the second body 18, may accommodate one or several object holders 41, wherein FIG. 2 merely as an example shows such an object holder as a cable holder. Several such object holders 41 may be arranged on sections 43, which are equipped for this, of the fastening element 14 These sections 43 could, for example, comprise a particular profile for establishing a positive-locking, non-positive-locking or a snap-on detent connection. In this way it is possible to hold, for example, cables or lines on the fastening element 14, for which purpose expensive shoulders and seals in the insulation packages 2, 8 and 10 would otherwise be required.

Figure 3:
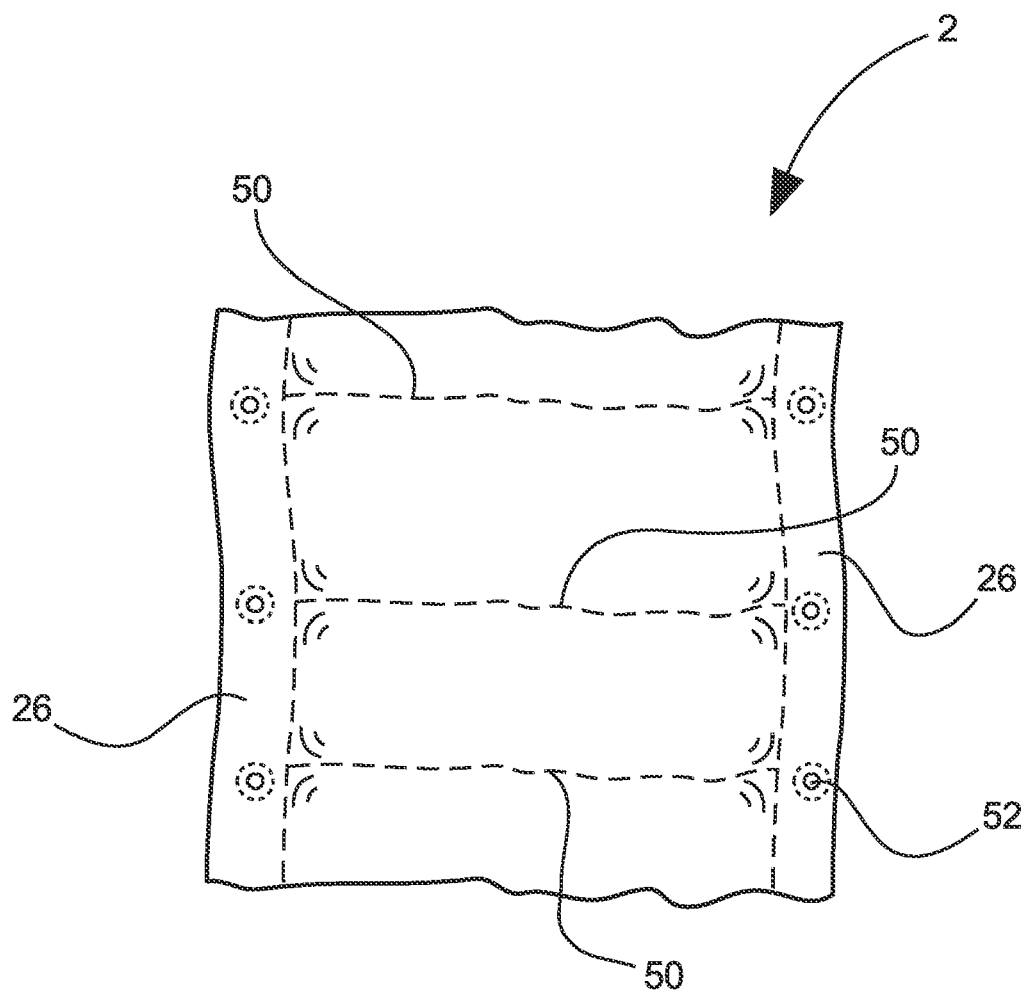
FIG. 3 shows an insulation package according to an embodiment of the invention.

FIG. 3 shows a section of an insulation package 2 for a skin field, which comprises several quilting seams 50 in order to improve the holding effect. In addition, optional openings 52 are shown at the margins 26, which openings 52 are suitable for fastening pins 12 to be fed through. However, the latter are only required if the margins 26 of the insulation package are folded over generously at the frame elements 4 and 6 so that the fastening pins 12 have to project through the margins 26.

Figure 4:
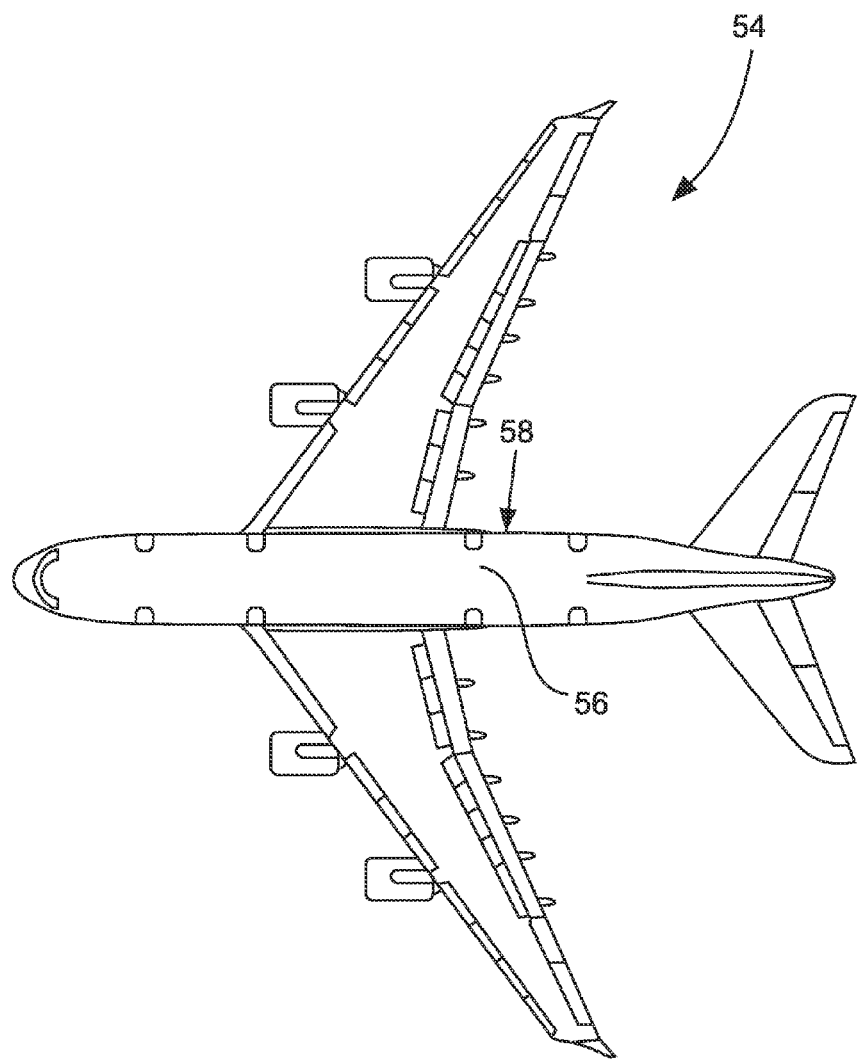
FIG. 4 shows an aircraft comprising at least one insulation package and at least one fastening element according to an embodiment of the invention.

FIG. 4 shows an aircraft 54 that comprises a cabin 56 which is thermally and acoustically insulated towards the exterior skin 58 of the aircraft, and preferably could comprise the above-presented insulation packages 2, 8 and 10 as well as the fastening elements 14 according to the invention.

Figure 5:
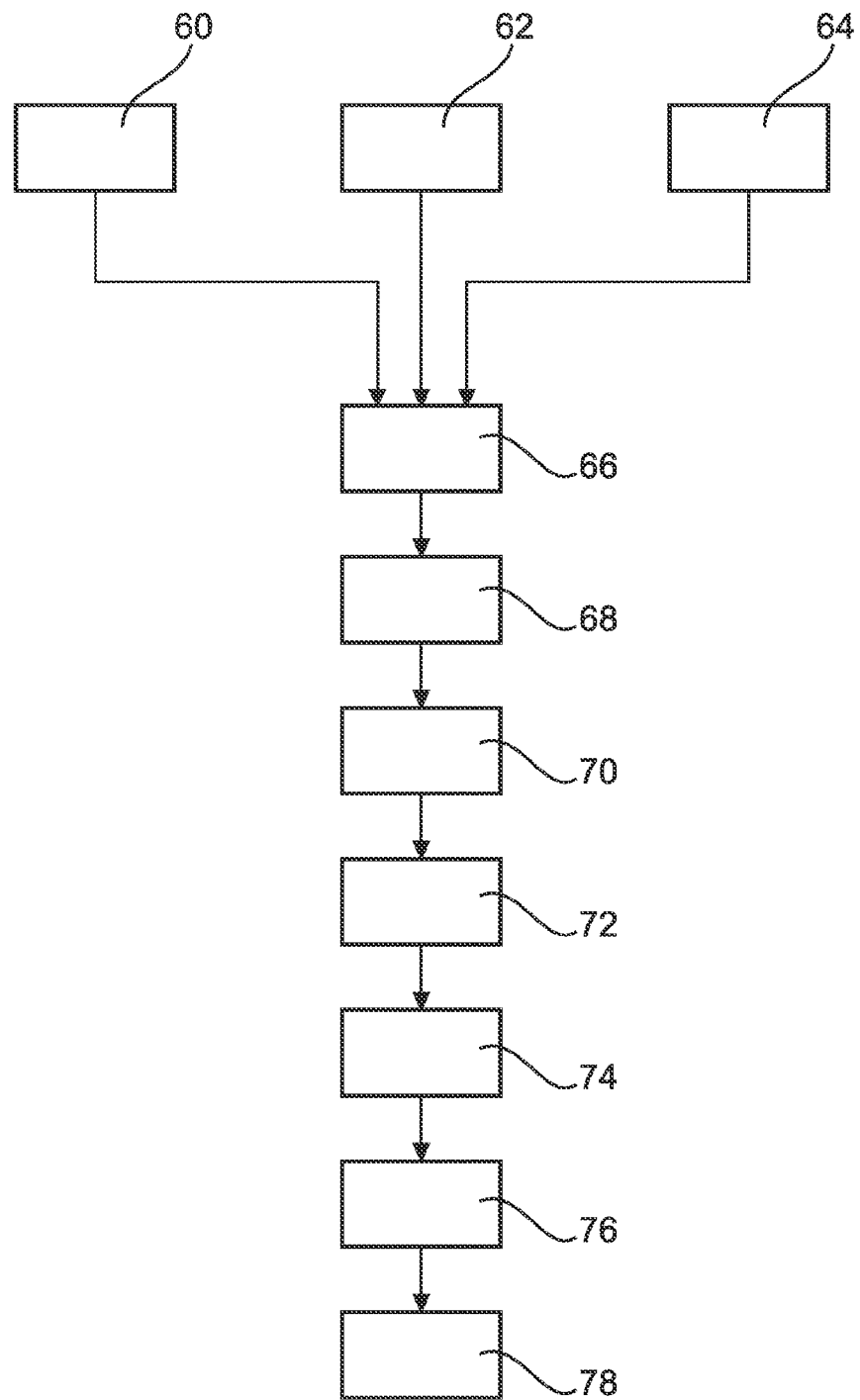
FIG. 5 shows a diagrammatic overview of a method according to an embodiment of the invention for fastening insulation packages.

Finally, FIG. 5 shows a diagrammatic overview of a method according to an embodiment of the invention for fastening insulation packages in a vehicle body or in a fuselage. After the provision 60 of insulation packages 2, 8 and 10, the provision 62 of fastening elements 14, and the provision 64 of fastening pins 12, there follows the affixation 66 of the fastening pins 12 to the frame elements 4 and 6. Subsequently the insulation package 2 is positioned 68 and the insulation packages 8 and 10 are placed 70 around the frame elements 4 and 6 and are arranged 72 on the fastening pins 12. Thereafter for each pair of fastening pins 12 a fastening element 14 is pressed together 74 and at the same time or successively the two opposite fastening pins 12 of the frame elements 4 and 6 are placed 76 into the corresponding openings 46 and 48 of the fastening element 12. This is followed by locking 78 the fastening element 14. During fastening, the position of the insulation package 2 should be checked so that the quilting seams 50 extend between the corresponding fastening pins 12 and are covered by the fastening elements 14 that are to be affixed.

Implementation of the fastening element by means of two rod-shaped bodies that may be pushed one inside the other is to be interpreted as an example only. It would also be possible to provide two bodies that are joined in an articulated manner, which bodies make it possible to maintain a space between the pressing elements and in this way make it possible to press the insulation packages together or to undo them from each other.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle, comprising:
   at least one cabin;
   a plurality of frame elements that define the at least one cabin;
   at least one frame insulation package substantially surrounding a perimeter of each frame element of the plurality of frame elements;
   at least one fastening element including:
   at least a first body;
   at least a second body; and
   at least a locking device,
   wherein the first body and the second body each include a pressing element for pressing the at least one frame insulation package against the respective one of the plurality of frame elements,
   wherein the first body and the second body movably engage each other so that the pressing element are located at opposite ends of the fastening element, and
   wherein at least one relative position of the first body to the second body can be fixed with the locking device.

2. The vehicle of claim 1, wherein the first body comprises a hollow profile for accommodating the second body.

3. The vehicle of claim 1, wherein the pressing elements are disc-shaped.

4. The vehicle of claim 1, further comprising an engagement device for engaging holding elements at the object.

5. The vehicle of claim 4, wherein the engagement device is a recess.

6. The vehicle of claim 4, wherein the engagement device is an indentation.

7. The vehicle of claim 4, wherein the engagement device is an opening.

8. The vehicle of claim 4, wherein the holding elements are designed as fastening pins that engage the engagement device that have been implemented as openings.

9. The vehicle of claim 1, wherein the first body and the second body comprise an elongated and stretched shape.

10. The vehicle of claim 1, further comprising a compression spring between the first body and the second body.

11. The vehicle of claim 1, wherein the locking device comprises a slit in the first body and a lever on the second body, the lever is guided in the slit, wherein locking takes place by moving the lever in a narrow passage of the slit.

12. The vehicle of claim 1, wherein the first body, the second body or both comprise perforations in order to reduce weight.

13. The vehicle of claim 1, wherein the first body, the second body or both comprise one or more sections for accommodating an object holder.

14. A method for fastening insulation packages in a cabin of a vehicle, comprising the steps of:
   providing at least one field mat insulation package, and at least one frame insulation package;
   providing at least one fastening element;
   positioning the field mat insulation package between adjacent frame elements of the cabin;
   placing the at least one frame insulation package substantially around a perimeter of each of the frame elements of the cabin;
   pressing together a fastening element;
   positioning the fastening element between the frame elements of the cabin;
   excursively moving the fastening element towards the frame elements of the cabin to clamp the at least one frame insulation package to the frame elements of the cabin; and
   locking the fastening element.

15. The method of claim 14, further comprising:
   providing fastening pins;
   affixing the holding elements to the fastening element;
   placing the holding elements into an engagement device of the fastening element.

16. The method of claim 14, further comprising the step of using the fastening element in an aircraft.

17. The vehicle of claim 1, wherein the vehicle is an airplane.

* * * * *